US010222290B2

(12) United States Patent
Yunker et al.

(10) Patent No.: US 10,222,290 B2
(45) Date of Patent: Mar. 5, 2019

(54) DETECTING MOISTURE PROXIMATE TO INSULATION (71) Applicants: William N. Yunker, The Woodlands, TX (US); Michael T. Matheidas, The Woodlands, TX (US)

(72) Inventors: William N. Yunker, The Woodlands, TX (US); Michael T. Matheidas, The Woodlands, TX (US)

(73) Assignee: ExxonMobil Upstream Research, Spring, TX (US)

( * ) Notice: Subject to any disclaimer, the term of this patent is extended or adjusted under 35 U.S.C. 154(b) by 127 days.

(21) Appl. No.: 15/183,164

(22) Filed: Jun. 15, 2016

(65) Prior Publication Data
US 2017/0045412 A1 Feb. 16, 2017

Related U.S. Application Data (60) Provisional application No. 62/203,683, filed on Aug. 11, 2015.

(51) Int. Cl.
*G01M 3/18* (2006.01)
(52) U.S. Cl.
CPC .................................... *G01M 3/18* (2013.01)
(58) Field of Classification Search
CPC ........ G01M 3/18; G01M 3/165; G01N 17/00; G01N 17/006; G01N 17/02; G01N 17/04; G01N 27/121
See application file for complete search history.

(56) References Cited

U.S. PATENT DOCUMENTS

| | | | | | |
|---|---|---|---|---|---|
| 3,927,351 | A | * | 12/1975 | Lambertsen | G01M 3/18 361/85 |
| 4,922,232 | A | * | 5/1990 | Bosich | G01M 3/045 200/61.04 |
| 5,036,287 | A | * | 7/1991 | Serwatzky | G01N 17/00 324/700 |
| 5,203,202 | A | * | 4/1993 | Spencer | G01M 3/165 73/40 |
| 5,225,812 | A | * | 7/1993 | Faghri | B63B 11/04 114/228 |
| 6,112,580 | A | * | 9/2000 | Hesky | G01M 3/18 324/220 |
| 6,134,485 | A | * | 10/2000 | Tanielian | G01D 21/02 244/17.13 |

(Continued)

FOREIGN PATENT DOCUMENTS

| | | | |
|---|---|---|---|
| WO | WO2008/059226 | 5/2008 | ............ G01M 3/18 |
| WO | WO2012/097241 | 7/2012 | ............ F16L 11/08 |

OTHER PUBLICATIONS

Micromem Applied Sensor Technologies, Inc.(2014), Product & Market Penetration, Brochure p. 17, Aug. 2014.

(Continued)

*Primary Examiner* — Natalie Huls
(74) *Attorney, Agent, or Firm* — ExxonMobil Upstream Research Company—Law Department (57) ABSTRACT

Systems and a method for detecting potential areas of corrosion under insulation are provided. An exemplary system includes an enclosure, insulation disposed upon an outer surface of the enclosure, and a number of microelectromechanical system (MEMS) sensors. The MEMS sensors detect water proximate to the insulation.

13 Claims, 9 Drawing Sheets

(56) References Cited

U.S. PATENT DOCUMENTS

| | | | |
|---|---|---|---|
| 6,946,855 B1* | 9/2005 | Hemblade | G01N 17/04 324/700 |
| 7,712,527 B2 | 5/2010 | Roddy | 166/250.14 |
| 7,881,881 B2 | 2/2011 | Giurgiutiu et al. | 702/39 |
| 8,810,264 B2* | 8/2014 | Bohon | G01N 27/121 324/700 |
| 8,884,382 B2 | 11/2014 | Stetter et al. | 257/414 |
| 9,267,874 B2* | 2/2016 | Lorenz | G01N 17/00 |
| 2003/0169058 A1* | 9/2003 | Pierre | G01N 17/02 324/700 |
| 2006/0244616 A1* | 11/2006 | Hill | G01M 3/045 340/604 |
| 2007/0046481 A1* | 3/2007 | Vokey | E04D 13/006 340/602 |
| 2009/0058427 A1* | 3/2009 | Materer | G01N 17/04 324/649 |
| 2009/0128169 A1* | 5/2009 | Fay | G01N 17/04 324/700 |
| 2012/0278018 A1* | 11/2012 | Hastreiter | G01M 3/18 702/65 |
| 2012/0291554 A1* | 11/2012 | Baba | G01N 29/228 73/632 |
| 2013/0037420 A1* | 2/2013 | Funahashi | G01N 17/04 205/775.5 |
| 2013/0063602 A1 | 3/2013 | Scapier | 348/160 |
| 2013/0134992 A1* | 5/2013 | Zhu | G01M 3/18 324/658 |
| 2013/0154666 A1* | 6/2013 | Albaladejo | G01M 3/165 324/601 |
| 2013/0344762 A1* | 12/2013 | Vermont | F16L 59/029 442/301 |
| 2014/0176344 A1 | 6/2014 | Littlestar et al. | 340/870.07 |
| 2014/0305524 A1* | 10/2014 | Heizer | F17D 5/00 137/551 |
| 2015/0198519 A1* | 7/2015 | Smyrl | G01N 17/02 205/776 |
| 2017/0003229 A1* | 1/2017 | Yunker | G01N 21/81 |

OTHER PUBLICATIONS

Rohrback Cosasco Systems, (Brochure), Cosasco Corrosion Under Insulation (CUI) Corrosion Sensors, 2 pages, www.cosasco.com.

* cited by examiner

DETECTING MOISTURE PROXIMATE TO INSULATION

CROSS REFERENCE TO RELATED APPLICATIONS

This application claims the priority benefit of U.S. Patent Application No. 62/203,683 filed Aug. 11, 2015 entitled DETECTING MOISTURE PROXIMATE TO INSULATION, the entirety of which is incorporated by reference herein.

FIELD

The present techniques relate generally to detecting moisture proximate to insulation, and more particularly, to an active system for indicating the presence of moisture infiltration in insulation systems.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Pipes, vessels, and other enclosures are often insulated for any number of reasons, such as reducing heat loss in hot systems, reducing heat gain in cold systems, protecting personnel, and increasing fire resistance. However, the use of insulation hides the surface of the enclosure from easy inspection. Accordingly, corrosion under the insulation (CUI) can form without easy detection.

CUI has challenged the oil and gas industry for years by causing unscheduled downtime from pipe and vessel failures, safety and environmental concerns, and downtime for inspections. CUI generally occurs as a result of water coming in contact with the metal of an enclosure, such as a pipe, vessel, or other metal structure, in an oxygen environment under an insulation layer, which results in corrosion. Water can make its way into the annular space between the enclosure and the insulation through several methods, including rainfall and firewater discharge and in some cases may be present in the insulating material itself. A number of techniques are used to prevent CUI, such as waterproofing the system, using corrosion inhibitors, or applying protective coating systems. Each of these methods have advantages and disadvantages, but they do not offer a means of detecting CUI.

Current methods for detecting CUI can be costly and time consuming. For example, CUI is most commonly detected by removing the insulation over an area of an enclosure or by cutting and removing small areas to allow for visual inspection or ultrasonic testing. However, cutting the insulation may also introduce a source of moisture. CUI can also be localized, causing visual inspections to miss affected areas. Other detection methods include radiography, x-ray, electromagnetic, ultrasound, neutron backscatter, and eddy current devices. These typically involve manually scanning long sections of pipe with complicated sensing devices calibrated to particular pipe thicknesses, material, etc.

Previous efforts have focused on either keeping the pipe dry or monitoring the humidity in the environment to detect moisture that may lead to CUI. For example, U.S. Patent Application Publication No. 2013/0344762 is directed to an insulation composition that includes a multi-layer structure. A first layer is a hydrophobic, moisture permeable layer composed of a woven, non-woven, or knit fibrous material. A second layer is a hydrophilic wicking layer, and a third layer is an insulation material layer. A method is provided to remove water from an insulated metal transport conduit comprising a metal transport conduit and an insulation composition. The insulation composition includes a layer of a high void material, through which a stream of gas is flowed from a first point. The stream of gas picks up water from the high void material and discharges it at a second point. A method is provided to detect and locate liquid water in an insulation composition positioned around a metal transport conduit by measuring the local electric conductivity in a wicking material.

U.S. Patent Application Publication No. 2013/0063602 is directed to an apparatus for monitoring humidity exposure of system components. The apparatus includes sensor modules for collecting environmental data and a monitoring module with a humidity indicator. An electrical monitoring component sealed from the environment reads a physical change in the humidity indicator to determine the humidity of the environment. A computer may transmit the humidity data and sensor readings, wirelessly or otherwise, to a central monitoring station for processing and storage. The humidity indicator may be disposed within an enclosure to determine the humidity within that enclosure. The humidity indicator may also be a desiccant that changes color based on the humidity, and the electrical monitoring component may be a camera configured to take video data of the desiccant.

SUMMARY

An embodiment disclosed herein provides a system for detecting water proximate to an insulation layer. The system includes an enclosure, insulation disposed over the enclosure, and a number of microelectromechanical system (MEMS) sensors, wherein the MEMS sensors detect water proximate to the insulation.

Another embodiment provides a method for detecting water proximate to an insulation layer. The method includes disposing the insulation layer over an enclosure, and disposing a plurality of microelectromechanical system (MEMS) sensors proximate to the insulation layer, wherein the MEMS sensors detect water.

Another embodiment provides a tape for detecting water proximate to an insulation layer. The tape includes a power bus, a communications bus, and a number of sensors mounted to the tape. The sensors are coupled to the power bus and the communications bus, and include a microelectromechanical system (MEMS) sensor configured to detect moisture. An impermeable cover is disposed over the tape, including pores disposed proximate to each of the plurality of sensors.

DESCRIPTION OF THE DRAWINGS

The advantages of the present techniques are better understood by referring to the following detailed description and the attached drawings, in which.

DETAILED DESCRIPTION

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

In recent decades, the development of microelectromechanical systems (MEMS) have led to numerous breakthroughs in the areas of sensors. Techniques for manufacturing MEMS allow for very complicated devices to be manufactured precisely and with repeatability in large batches that may have attractive economies of scale. MEMS sensors may provide substantial advantages over larger sensors in terms of size, power consumption, cost, volume, and weight.

In embodiments described herein, MEMS sensors are used to detect water infiltration into an insulation around a pipe or other enclosure, for example, by detecting high humidity levels. The water infiltration may result from damaged cladding, leaking sealant, or other issues. If certain piping areas show increasing trends of humidity the MEMS sensors can be used to alert operators to inspect that particular area, for example, for damage to insulation cladding or potential CUI, depending on levels seen over time. This method of targeted maintenance could greatly reduce operating costs in facilities by allowing targeted maintenance of insulation and cladding for CUI prevention instead of removing the insulation over large areas to visually inspect piping, vessels, or other enclosures.

In one embodiment, a cable having a number of mounted MEMS sensors can be attached to the outside of an enclosure, such as a pipe, and used to detect moisture infiltration that may lead to corrosion under insulation (CUI). The MEMS sensors may be used in voting techniques for reliability, for example, to limit false readings from faulty sensors. The cable may also have thermocouples to measure pipe temperature. Control logic can be implemented to track the times during which the pipe is likely to condense water on the outside diameter and promote CUI. Other types of sensors, using MEMS technology as well as other systems, may be included to enhance the detection of CUI.

Additionally, conditions during which CUI has occurred can be tracked and used to generate data sets that may be used to track when CUI is likely to be occurring. In some embodiments, other MEMS sensors, such as thickness detectors, may be included and used to raise an alarm when CUI has progressed to dangerous levels based on pipe thickness.

The MEMS sensors may also be used to trigger actions in a maintenance program. Areas that show increasing levels of humidity, or direct water infiltration, can be targeted for insulation and cladding repair or replacement. Similarly, areas where an alarm has been raised for suspected high or very high levels of moisture over time can be targeted for insulation replacement and visual inspection for CUI. This can decrease the need to remove the insulation and cladding from an entire enclosure to inspect for CUI.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As used herein, "corrosion under insulation" or "CUI" is a form of localized external corrosion on an enclosure. CUI may occur when water has been trapped or adsorbed by the insulation and remains in contact with the enclosure for a significant period of time, for example, in the presence of oxygen and elevated temperatures. In carbon steels, CUI can manifest itself as wall thickness loss or pitting. In stainless steels, the most common form of corrosion from CUI is chloride stress corrosion cracking caused by chloride deposits. The chlorides are deposited on the pipe after water with chloride salts evaporates from the outer surface of a pipe, vessel, or other enclosure, depositing the chloride salts.

As used herein, a "communications bus" includes a line or lines that enable units coupled to the communications bus to send signals to another unit. For example, MEMS sensors mounted along a tape may communicate with each other and a process control computer over a communications bus mounted along the tape. The communications bus may also be a power bus or partially separate from the power bus, such as a single communication line that uses the ground line in a power bus.

As used herein, an "enclosure" is a container or conduit for liquids or solids, and may include such configurations such as a pipe, a cylinder, a vessel, a chamber, a container, or a receptacle. Generally, the enclosure will be sealed from the ambient surroundings and insulated as the material inside will be at a substantially different temperature from the surroundings, for example, hotter or colder. Enclosures may be in any number of locations and used for any number of purposes. For example, an enclosure may be a field unit used for hydrocarbon processing, a process unit used in a chemical plant or refinery, a ship board vessel, or any number of other units.

As used herein, "heat trace tape" is a structure that has a heating element inside a flexible covering. It may be used under the insulation over an enclosure to protect the contents of the enclosure from losing energy to the environment. For example, heat trace tape may be used along water lines to prevent freezing.

As used herein, "insulating material" is a material with a thermal conductivity of less than about 12 Watts/(m*° C.) (7 Btu/(hr.*ft.*° F.)). Examples of insulating materials include mineral fibers (such as perlite), rubber, polymer foams (e.g. polyurethane foams, polyvinyl chloride foams, polystyrene foams, and polyethylene foam), glass fibers, a vacuum, and/or microporous insulation such as aerogel. When mounted in place over an enclosure, the insulating materials are termed "insulation."

As used herein, "microelectromechanical systems" or "MEMS" are devices that are fabricated with mechanical or electromechanical components that are often between about 0.1 and about 100 micrometers (μm) in size, forming systems that are on the order of 10 um to a few millimeters. The fabrication may be performed using the same techniques, e.g., photolithography and etching, which are used to form integrated circuits. The mechanical and electromechanical components can be configured to physically interact with their environment. MEMS sensors have been used to detect the presence of water in air in various industries such as manufacturing, HVAC (heating, ventilation, and air-conditioning), medical, and electronics. MEMS humidity sensors can be designed in a variety of ways. Some examples include measuring capacitance change due to moisture accumulation, or adsorption by a sensing material, as well as water sensitive resistors coupled with an on-chip piezo resistive Wheatstone bridge circuit. The most typical MEMS humidity sensors types are capacitive, resistive, or displacement. The most widely used MEMS humidity sensors are of the capacitive type. The MEMS sensors may also include sensors that detect direct water contact, such as oxidation reduction potential (ORP) sensors.

As used herein, a "power bus" includes power lines or traces that provide power to units, for example, power lines mounted along a tape to provide power to sensors mounted along the tape. The power lines may be used for communication purposes as well as power.

As used herein, "proximate to" indicates that a material or item is physically close to another item. The item that is proximate may be in a layer underneath the other item, a layer over the other item, or incorporated into the other item itself.

As used herein, "substantially", "predominately" and other words of degree are relative modifiers intended to indicate permissible variation from the characteristic so modified. It is not intended to be limited to the absolute value or characteristic which it modifies, but rather possessing more of the physical or functional characteristic than its opposite, and preferably, approaching or approximating such a physical or functional characteristic.

Figure 1A:
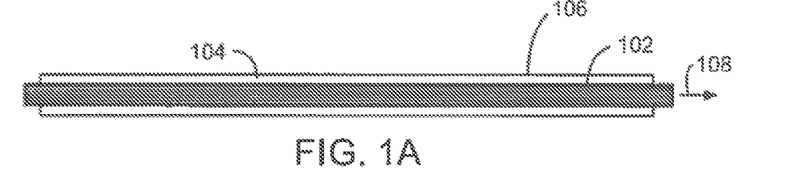
FIGS. 1A-1C are side cross sectional drawings illustrating water intrusion and accumulation leading to corrosion under insulation (CUI)
Figure 1B:
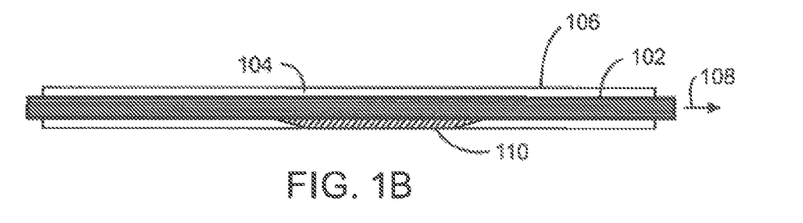
Figure 1C:
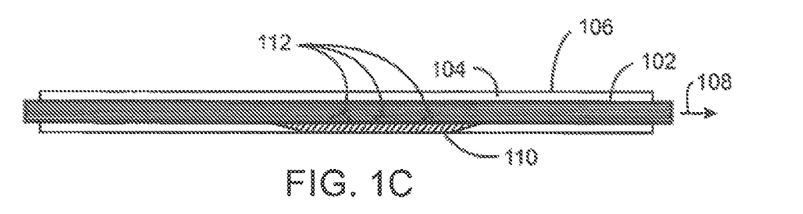

FIGS. 1A-1C are side cross sectional drawings illustrating water intrusion and accumulation leading to corrosion under insulation (CUI). FIG. 1A is a side sectional drawing of an enclosure, depicted as pipe 102, with a layer of insulation 104 covering the pipe 102. A cladding 106, such as sheets of aluminum or steel, may protect the insulation 104 from damage and environmental conditions, such as impact, water, fire, and the like. The insulation 104 may help to maintain the contents 108 of the pipe 102 at a higher or lower temperature than the ambient environment, and may also provide fire protection for the contents 108. However, the insulation 104 and cladding 106 may not be impermeable to water and moisture infiltration, which may build up over time creating conditions favorable for CUI.

FIG. 1B is a side cross sectional drawing of a pipe 102 showing the accumulation or pooling of water 110 in the insulation 104. This may take place at a low spot along the pipe 102, or may be along a longer section of the pipe 102. For other types of enclosures, such as vessels, the pooling may occur along the bottom surface of the enclosure. As illustrated in the side cross sectional view of FIG. 10, over time, the exposure of the pipe 102 to the water 110 may lead to CUI 112. If the CUI 112 reaches severe levels without detection, it can lead to failure of the pipe 102, potentially releasing the contents 108 to the environment. The CUI 112 may be mitigated by detecting the infiltration of the water 110 earlier in the process, allowing the insulation 104 to be removed and replaced before the CUI 112 occurs.

Figure 2:
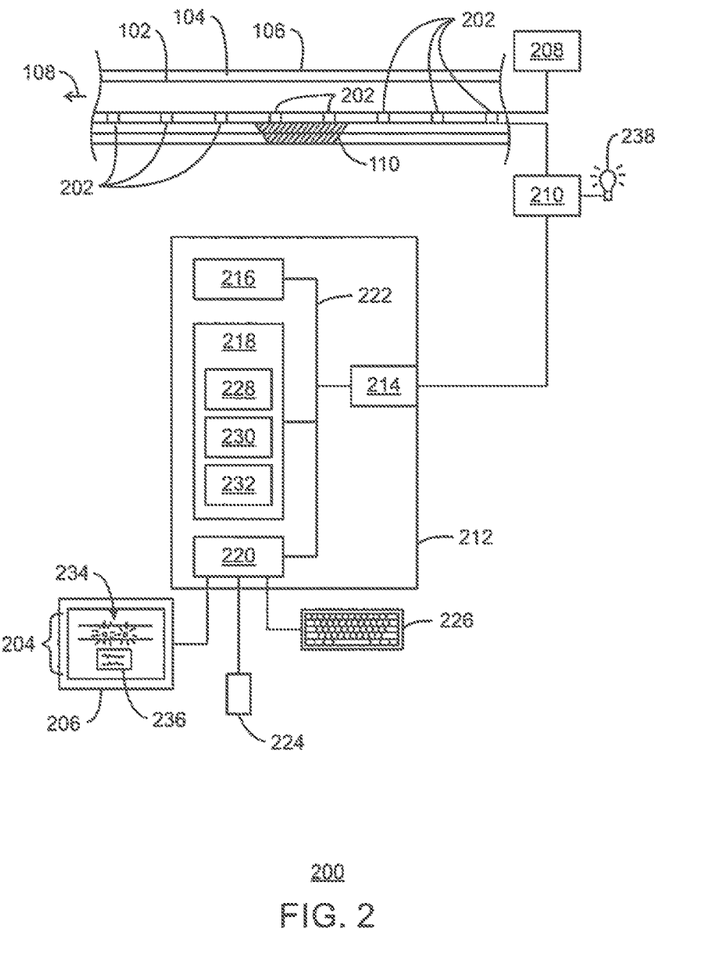
FIG. 2 is a block diagram of a system for detecting the presence of water in insulation, in accordance with some embodiments.

FIG. 2 is a block diagram of a system 200 for detecting the presence of water in insulation, in accordance with some embodiments. Like numbered items are as described with respect to FIG. 1. In embodiments described herein, MEMS sensors 202, including transducers configured to detect the presence of humidity or water in the environment, may be mounted along an enclosure, such as a pipe 102. The MEMS sensors 202 may detect humidity by measuring a physical change of a mechanical part in the MEMS sensor 202 or detecting water contact by measuring an electrical change between electrodes. The MEMS sensors 202 may be used to activate or display an alarm 204, for example, on a process control monitor 206 in a control room, when the moisture level or humidity in the environment surrounding the pipe 102 has reached a level that would promote CUI. In addition, the environment in the annular space between the pipe 102 and the insulation 104, and/or inside a layer of insulation 104, can be tracked and trended over time.

The MEMS sensors 202 may be coupled to a power system 208, which may be, for example, part of a heat trace power supply. As the heat trace may only be active for a portion of time, depending on a temperature set point, an amount of current may remain active continuously to power the MEMS sensors 202. The MEMS sensors 202 may not be coupled to a power supply in every embodiment. For example, each MEMS sensor 202 may be designed to generate current itself to report an alarm condition, for example, through changes in a piezoelectric crystal. Further, the MEMS sensors 202 may be powered during a query cycle, instead of continuously, such as by electromagnetic energy received at an antenna in a radio frequency identification (RFID) system. In this embodiment, the MEMS sensor 202 may obtain and report the measurement results.

A communication system 210 may be used to obtain signals from the MEMS sensors 202, for example, over a 4-20 milliamp bus, a fieldbus, or other types of communication links. The communication system 210 may provide the signals from the MEMS sensors 202 to a process control computer 212 or other computing system, for example, through an interface 214. Further, the MEMS sensor 202 may transmit alarm signals wirelessly, for example, via a local power source, such as onboard battery power or energy harvested using wired or wireless sensors. For example, the MEMS sensors 202 may be powered by temperature differentials or vibrations.

The process control computer 212 may have a processor 216 that is coupled to a storage device 218 and a human-machine interface (HMI) 220 through a bus 222. The HMI 220 may provide an interface to one or more input devices, such as a pointing device 224 and a keyboard 226. The HMI 220 may also provide an interface to the process control monitor 206. The units described here are merely a simplified example, as the system 200 will often include many more units, such as multiple process control computer systems, processors, storage devices, and the like.

The storage device 218 may include a number of code modules configured to direct the processor 216 to alert an operator that insulation around an enclosure has water infiltration, or high humidity conditions, in proximity to the MEMS sensor 202. For example, the storage device may include a query module 228 to identify the location and readings from a MEMS sensor 202. This may include obtaining or receiving data from a MEMS sensor 202 in proximity to water 110 that has infiltrated the insulation 104. A voting module 230 may be included to direct the processor 216 to compare readings from a number of MEMS sensors 202 to determine if the reading is consistent with other MEMS sensors 202 and environmental conditions, such as temperature, time, and process conditions. This may reduce the number of false alarms that may be triggered in the system 200 and lower the costs of removing insulation when not needed. For example, water vapor typically does not cause corrosion, however this may be the information measured by the MEMS sensors 202. Alarm conditions may include any number of indications, such as the presence of a significant amount of water vapor, a process upset, or a shutdown that may allow a cooling of the environment and the condensation of water on the outside of the pipe. This may trigger a CUI alarm, or could be highlighted as a CUI relevant event, and trended overtime. Once there has been enough time at the right conditions to promote CUI, the alarm 204 may be sounded to indicate the potential presence of CUI. Additionally, the number of times these cycles occur can trigger more severe alarms and prioritize the most likely areas for operators to inspect.

An alerting module 232 may work with other process control and display software (not shown) to provide the alarm 204. The alarm 204 may indicate the location of the infiltration on a graphical display 234, such as on a map of the plant. Further, in addition to, or instead of, the graphical display 234, a text display 236 may indicate the precise parameters, such as the location of the MEMS sensors 202, amount of humidity or water detected, number of concurring MEMS sensors 202, and the like. Additionally, the sensor string can be connected to local alarms, for example, through the communications system 210, such as flashing lights 238 to indicate specific regions or areas of water infiltration.

Figure 3:
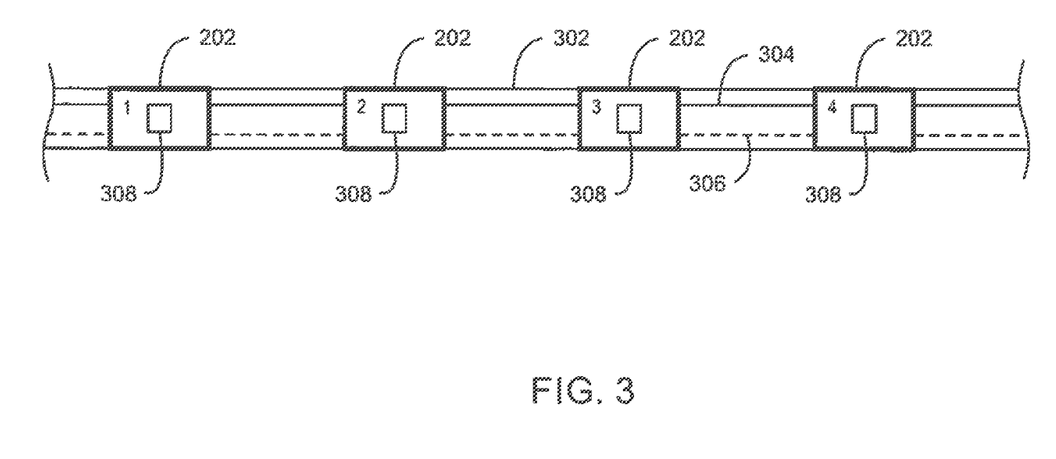
FIG. 3 is a drawing of a tape that includes a number of microelectromechanical system (MEMS) sensors, in accordance with an embodiment.

FIG. 3 is a drawing of a tape 302 that includes a number of MEMS sensors 202, in accordance with an embodiment. Like numbered items are as described with respect to FIG. 2. As described herein, the MEMS sensors 202 may be mounted on a tape 302, composed of a polymer to allow ease of installation and protection of the sensors. The tape may resemble heat trace tape in the way it is banded to the pipe. In another embodiment, the heat trace elements and MEMS CUI sensors may even be integrated together in the same tape. The tape 302 may have a power bus 304, for example, a heat trace power supply or a separate power supply. A communications bus 306 may carry signals detected by the sensing portion 308 of the MEMS sensors 202 from the tape 302, for example, in serial communications packets that identify the sensor, e.g., 1-4 in this figure, and the sensor reading. The location of the MEMS sensors 202 may be determined from the identification, such as 1-4 in this example, and the mounting location used for the tape 302. In some embodiments, the MEMS sensors 202 may be placed adjacent to location units, such as a global positioning satellite (GPS) unit, RFID (Radio Frequency Identification Device), or other units configured to determine a location in the plant. Further, the MEMS sensors 202 may include the location units along with the sensing circuitry.

Figure 4:
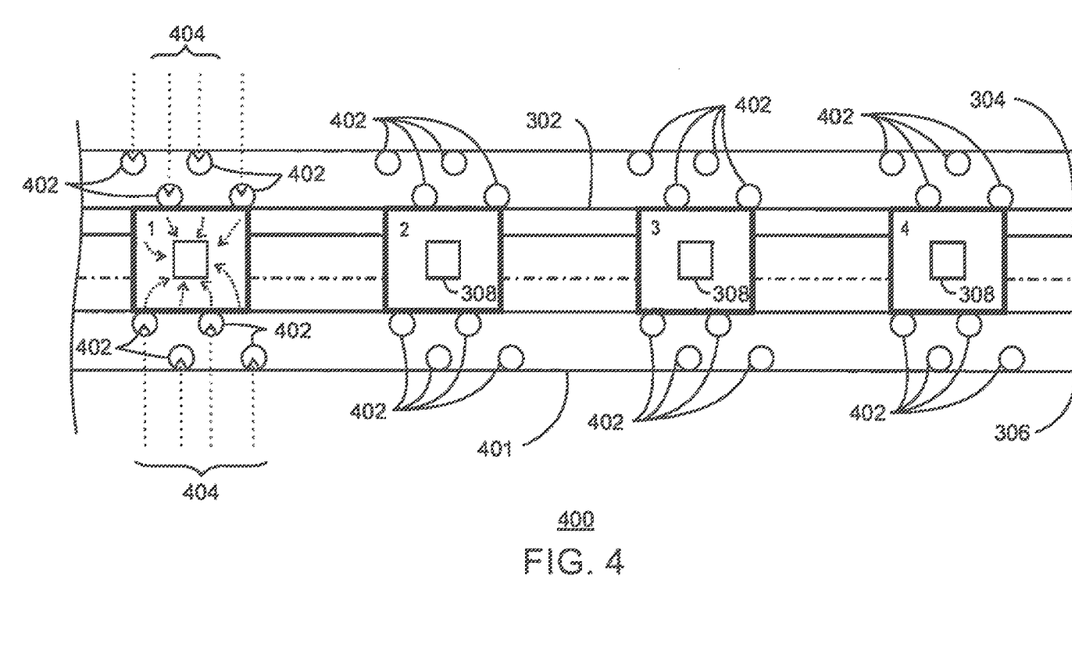
FIG. 4 is a drawing of a tape 400 with MEMS sensors 202 in an impermeable cover 401 that has openings, or pores 402, disposed proximate to the MEMS sensors 202, in accordance with an embodiment.

FIG. 4 is a drawing of a tape 400 with MEMS sensors 202 in an impermeable cover 401 that has openings, or pores 402, disposed proximate to the MEMS sensors 202, in accordance with an embodiment. Like numbered items are as described with respect to FIGS. 2 and 3. The impermeable cover 401 may include any number of materials, such as polyvinyl chloride (PVC), polyurethane, polypropylene, and the like. Depending on the application, stiffer or more temperature resilient materials may be used, such as polyphenylene sulfide (PPS), glass, or mineral materials.

However, the sensing portion 308 of each MEMS sensor 202 needs to be able to detect the environmental conditions proximate to the tape 400, such as under the insulation over an enclosure. The impermeable cover 401 protects the electronic portion or circuitry of the MEMS sensor 202, as well as the power bus 304 and the communications bus 306, from shorting. The pores 402 allow access to the environment for the sensing portion 308 of the MEMS sensor 202, allowing vapors 404 to reach the sensing portion 308. The access is not limited to pores 402, as any number of porous materials may be used to allow vapors 404 to reach the sensing portion 308.

Figure 5:
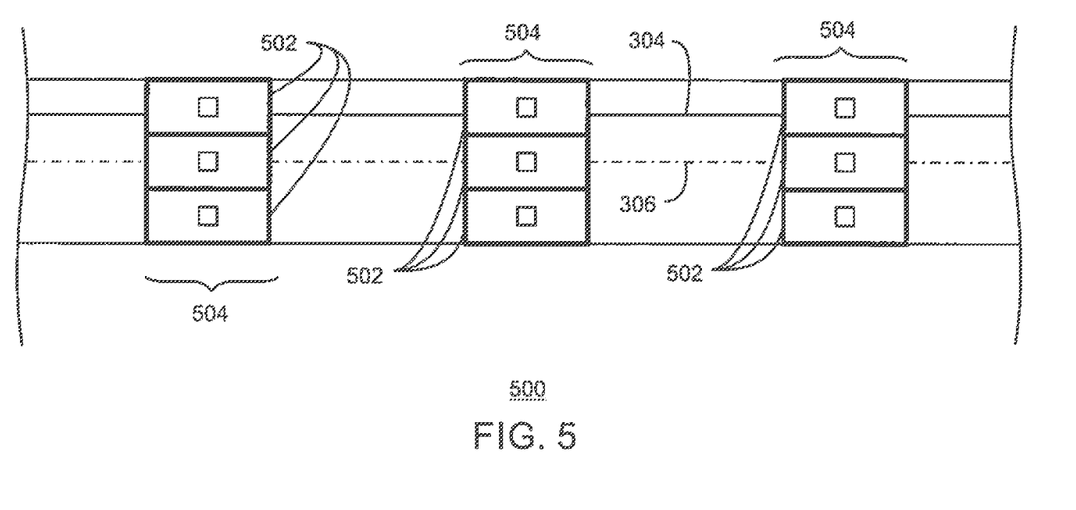
FIG. 5 is a drawing of a tape 500 having a number of MEMS sensors 502 at each location 504 along the tape 500, in accordance with an embodiment.

FIG. 5 is a drawing of a tape 500 having a number of MEMS sensors 502 at each location 504 along the tape 500, in accordance with an embodiment. Like numbered items are as described with respect to FIG. 3. The MEMS sensors 502 may be batch produced and installed along the tape 500 in groups, for increased reliability or redundancy. This may lower the chances of receiving a false positive from the MEMS sensors 502, as a voting scheme may be implemented for the MEMS sensors 502 at each location 504. Further, a sensor failure may be more easily detected with multiple MEMS sensors 502 at each location 504. The number of sensors can be selected to allow for a statistical distribution of failures while still achieving the ultimate reliability goal through number of sensors instead of increased reliability of individual components.

Figure 6:
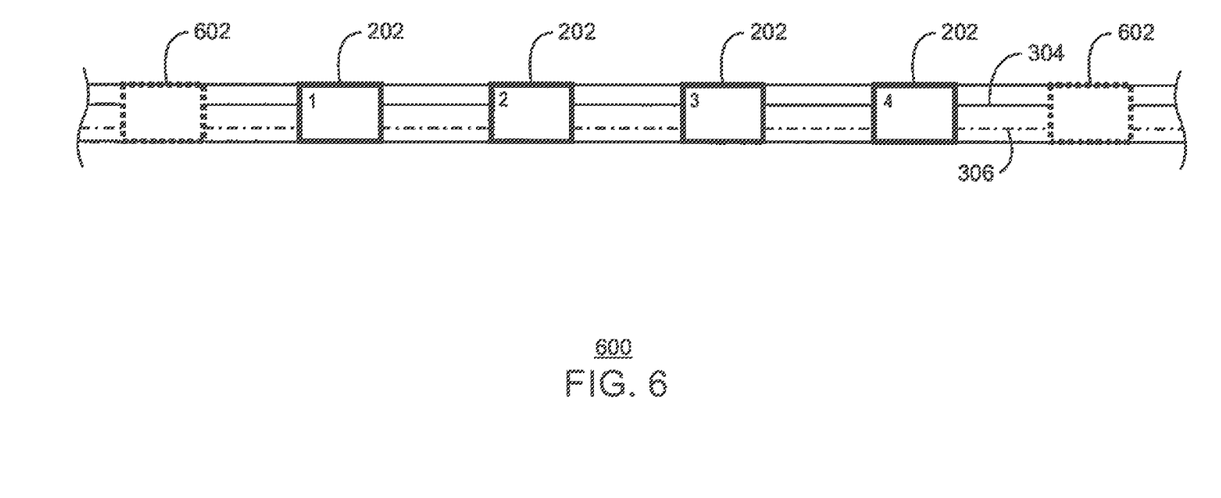
FIG. 6 is a drawing of a tape having a temperature sensor interspersed between MEMS sensors, in accordance with an embodiment.

FIG. 6 is a drawing of a tape 600 having temperature sensors 602 interspersed between MEMS sensors 202, in accordance with an embodiment. Like numbered items are as described with respect to FIGS. 2 and 3. MEMS sensors 202 configured to measure humidity can be linked with the temperature sensors 602, such as thermocouples, to measure the temperature on the outside of an enclosure, such as a pipe. The two values may be used together to help predict CUI as the pipe cools down during a shutdown condition and then heats back up when production resumes.

Further, the tape 600 is not limited to humidity and temperature sensors, as any number of other sensors and MEMS devices may be included. For example, MEMS accelerometers may be included along the tape 600, for example, to detect impacts on a pipeline. Other MEMS devices may include audio transducers that can be used to send audio pulses into an enclosure, such as a pipe, and audio detectors to receive sounds and determine a thickness for the wall of the enclosure. Further, a MEMS device that detects hydrocarbon may be included along the tape 600 to alert operators to the presence of hydrocarbons in the vicinity of the pipe.

The MEMS sensors are not limited to being mounted to a tape, but may be deployed in any number of other configurations. For example, a MEMS sensor may be incorporated into a device configured to pierce an insulation layer to place the MEMS sensor in the vicinity of an enclosure, such as a pipe. Such a piercing device may be termed a "stinger."

Figure 7:
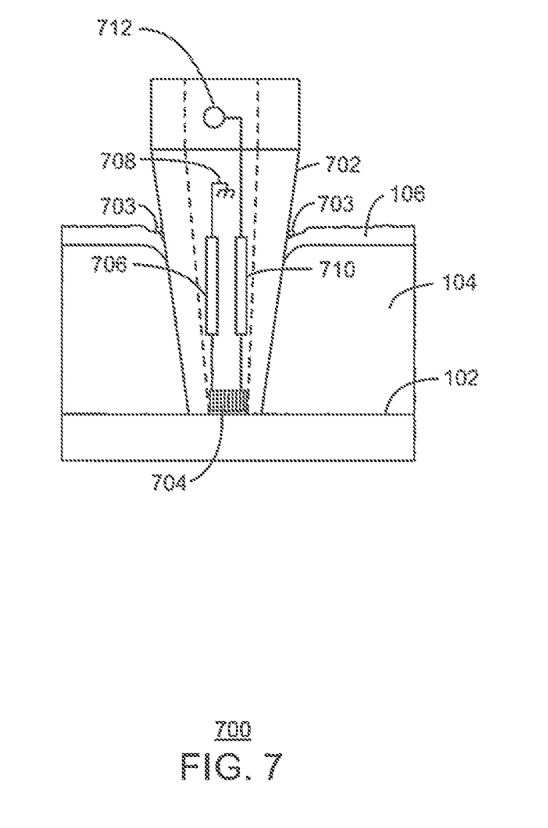
FIG. 7 is a cross sectional drawing of a stinger 700 that includes a body 702 with a MEMS sensor 704, in accordance with an embodiment.

FIG. 7 is a cross sectional drawing of a stinger 700 that includes a body 702 with a MEMS sensor 704, in accordance with an embodiment. Like numbered items are as described with respect to FIGS. 1A-1C. The stinger 700 may puncture the cladding 106 and insulation 104 over an enclosure, such as a pipe 102. The stinger 700 may be sealed to the cladding 106 after the insertion, such as with a bead of sealing compound 703, to decrease water infiltration through the insertion point.

The body 702 of the stinger 700 may have a permeable tip to allow humidity or water to infiltrate the stinger 700 and contact the MEMS sensor 704. If high humidity levels are detected, a transmitter 706 coupled to an antenna 708 may broadcast the sensor readings to a receiver for communication to a process control computer, for example, through a Bluetooth low energy (BLE) protocol, or other similar wireless protocols. The stinger 700 may also include a driver 710 that can power a light emitting diode 712 to indicate a high humidity condition at the site of the stinger 700. The power may also be obtained through an energy harvesting device converting sources such as vibration or temperature into electrical power. The transmitter 706 and driver 710 may each include a battery or other power supply, or a separate battery may be included in the stinger 700 to power both. Alternatively, an energy capture system may power the stinger 700 from other energy sources.

Figure 8:
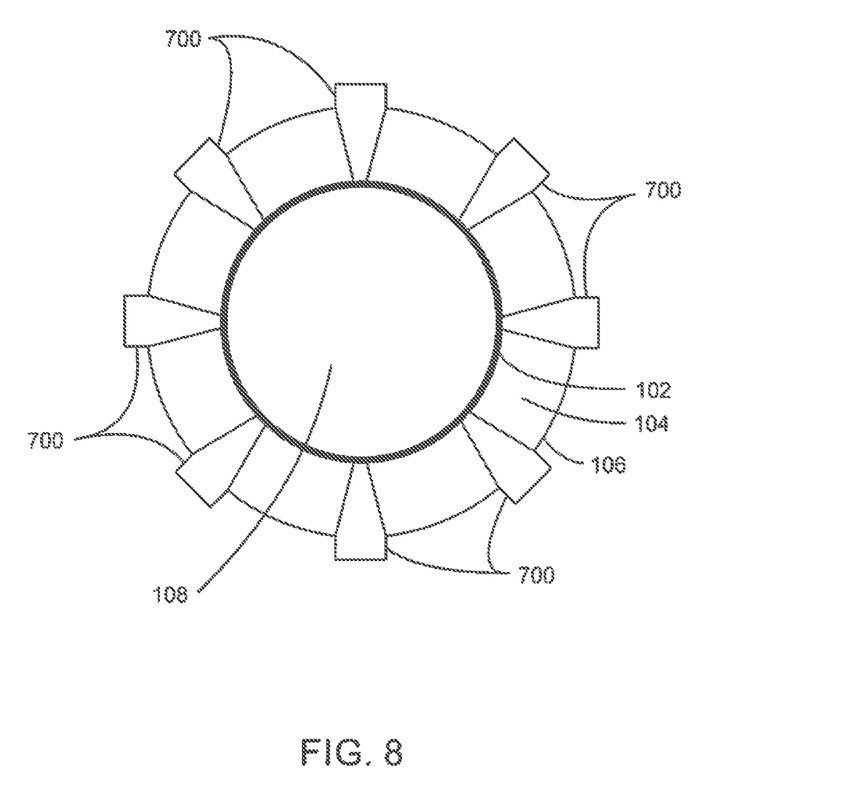
FIG. 8 is a cross sectional drawing of a pipe with a number of stingers inserted around the circumference, in accordance with an embodiment.

FIG. 8 is a cross sectional drawing of a pipe 102 with a number of stingers 700 inserted around the circumference, in accordance with an embodiment. Like numbered items are as described with respect to FIGS. 1 and 7. In this embodiment, the stingers 700 may be placed in limited areas, for example, areas of likely or prior water infiltration, among others. This may reduce the need for stripping large areas of insulation to install tapes with MEMS sensors. Later, once insulation is removed during normal inspection, or upon the detection of water infiltration, a tape including MEMS sensors may be installed. It may be more economical to use the stingers 700 in some applications, such as longer pipelines.

Figure 9:
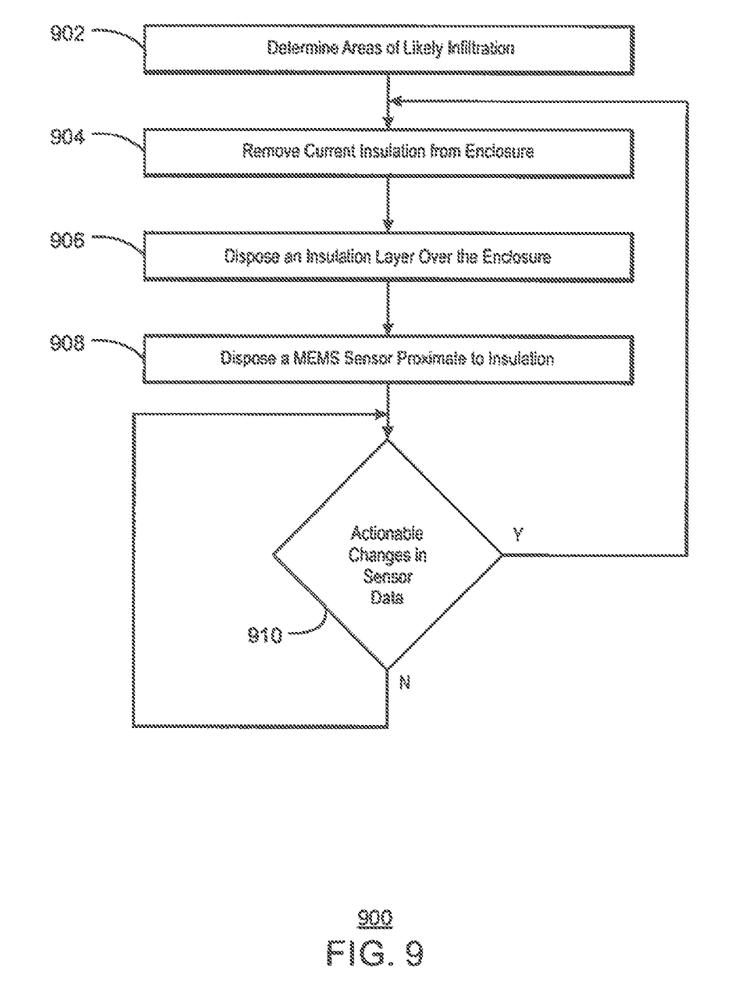
FIG. 9 is a process flow diagram of a method for detecting the presence of water infiltration around an enclosure, in accordance with embodiments.

FIG. 9 is a process flow diagram of a method 900 for detecting the presence of water infiltration around an enclosure using MEMS sensors, in accordance with embodiments. The method starts at block 902 by determining areas of likely water infiltration. This may be done during normal inspection, for example, when areas of the enclosure that have had CUI or have wet insulation are identified. At block 904, the current insulation is removed from the enclosure. This may be done over a larger area than is used for the inspection to ensure areas of likely water infiltration or CUI are identified. At block 906, a new insulation layer is installed over the enclosure.

At block 908, one or more MEMS sensors is disposed proximate to the insulation, for example, mounted along a tape disposed above or below the insulation during the installation. The installation of the MEMS sensors may also be done through the insertion of stingers through current insulation or new insulation.

At block 910, a determination is made whether the MEMS sensors indicate actionable changes in the sensor data. This may be performed at the level of the electronics in the MEMS sensor, for example, through a set point that does not send a signal until a humidity level, or other conditions, are exceeded. In addition to, or instead of, an internal set point, a process control system may query a MEMS sensor to determine the current value for the humidity or other measurements. If an actionable change is detected in the measurements, process flow proceeds to block 902, at which insulation may be removed from the enclosure to check for CUI. As described herein, this may be scheduled and performed only in the limited areas in which the MEMS sensors are indicating alert conditions. If no actionable changes are detected, then process flow returns to block 910 to continue monitoring.

Embodiments of the present techniques may include any number of combinations of the systems and methods described herein. Embodiments that may be used are listed in the following numbered paragraphs.

1. A system for detecting water proximate to an insulation layer, including:
an enclosure;
insulation disposed on an outer surface of the enclosure; and
a plurality of microelectromechanical system (MEMS) sensors, wherein the plurality of MEMS sensors indicate water proximate to the insulation.

2. The system of paragraph 1, wherein the enclosure includes a pipe.

3. The system of paragraphs 1 or 2, wherein the enclosure includes a process unit, a field unit, a cylinder, a vessel, a chamber, a container, a receptacle, a pipe, or any combinations thereof.

4. The system of any of paragraphs 1-3, wherein the plurality of MEMS sensors includes humidity sensors, water sensors, or temperature sensors, or any combinations thereof.

5. The system of any of paragraphs 1-4, including a computing system configured to determine a location of a MEMS sensor that has detected an actionable change, and alert an operator.

6. The system of any of paragraphs 1-5, wherein the plurality of MEMS sensors is mounted along a tape.

7. The system of paragraph 6, wherein the tape includes a power bus and a communications bus.

8. The system of paragraph 6, wherein the enclosure includes a pipe, and wherein the tape is disposed along an axis of the pipe.

9. The system of paragraph 6, wherein the tape is disposed between the insulation and the enclosure.

10. The system of paragraph 6, wherein the tape is disposed between the insulation and a layer of cladding.

11. The system of paragraph 6, wherein the tape integrates MEMS sensors with a heat trace.

12. The system of paragraph 6, wherein the tape includes a cover that is permeable in a location proximate a sensing portion.

13. The system of any of paragraphs 1-12, including a process control computer configured to determine, from the plurality of MEMS sensors, a location of water infiltration into an insulation layer.

14. The system of any of paragraphs 1-13, including a stinger having one of the plurality of MEMS sensors, wherein the stinger penetrates through the insulation to the outer surface of the enclosure.

15. The system of paragraph 14, wherein the stinger includes a transmitter.

16. The system of paragraph 14, wherein the stinger includes a light emitting diode.

17. A method for detecting water proximate to an insulation layer, including:
disposing the insulation layer upon an outer surface of an enclosure; and disposing a plurality of microelectromechanical system (MEMS) sensors proximate to the insulation layer, wherein the MEMS sensors detect water.

18. The method of paragraph 17, including disposing the plurality of MEMS sensors in a tape along the outer surface of the enclosure.

19. The method of paragraph 17 or 18, including identifying a location of water infiltration from the plurality of MEMS sensors.

20. A tape for detecting water proximate to an insulation layer, including:
 a power bus;
 a communications bus;
 a plurality of sensors mounted to the tape and coupled to the power bus and the communications bus, wherein the plurality of sensors includes a microelectromechanical system (MEMS) sensor configured to detect moisture; and
 an impermeable cover over the tape, including pores disposed proximate to each of the plurality of sensors.

21. The tape of paragraph 20, including a number of MEMS sensors at each of a plurality of locations along the tape.

22. The tape of paragraph 20 or 21, wherein the plurality of sensors includes a temperature sensor.

23. The tape of any of paragraphs 20, 21, or 22, wherein the plurality of sensors includes a hydrocarbon sensor.

24. The tape of any of paragraphs 20-23, wherein the plurality of sensors includes an acoustic sensor configured to detect acoustic waves.

25. The tape of any of paragraphs 20-24, wherein the plurality of sensors includes a MEMS accelerometer.

While the present techniques may be susceptible to various modifications and alternative forms, the examples discussed above have been shown only by way of example. However, it should again be understood that the techniques are not intended to be limited to the particular examples disclosed herein. Indeed, the present techniques include all alternatives, modifications, and equivalents falling within the true spirit and scope of the appended claims.

What is claimed is:

1. A system for detecting water proximate to an insulation layer, comprising:
 an enclosure;
 insulation disposed on an outer surface of the enclosure; and
 a plurality of microelectromechanical system (MEMS) sensors, wherein the plurality of MEMS sensors detect water proximate to the insulation, and wherein the MEMS sensors comprise an electronic circuitry, a power bus and a sensing portion;
 wherein the plurality of MEMS sensors is mounted along a tape, and wherein the tape comprises a cover that is impermeable in a location proximate of the electronic circuitry and the power bus, and the tape comprises a cover that is permeable in a location proximate the sensing portion.

2. The system of claim 1, wherein the enclosure comprises a pipe.

3. The system of claim 1, wherein the enclosure comprises a cylinder, a vessel, a chamber, a container, a receptacle, or a pipe, or any combinations thereof.

4. The system of claim 1, wherein the plurality of MEMS sensors comprises humidity sensors, water sensors, or temperature sensors, or any combinations thereof.

5. The system of claim 1, comprising a computing system configured to determine a location of a MEMS sensor that has detected an actionable change, and alert an operator.

6. The system of claim 1, wherein the tape comprises a power bus and a communications bus.

7. The system of claim 1, wherein the enclosure comprises a pipe, and wherein the tape is disposed along an axis of the pipe.

8. The system of claim 1, wherein the tape is disposed between the insulation and the enclosure.

9. The system of claim 1, wherein the tape is disposed between the insulation and a layer of cladding.

10. The system of claim 1, wherein the tape integrates MEMS sensors with a heat trace.

11. The system of claim 1, comprising a process control computer configured to determine, from the plurality of MEMS sensors, a location of water infiltration into an insulation layer.

12. A method for detecting water proximate to an insulation layer, comprising:
 disposing the insulation layer upon an outer surface of an enclosure; and
 disposing a plurality of microelectromechanical system (MEMS) sensors proximate to the insulation layer, wherein the MEMS sensors detect water proximate to the insulation layer, and wherein the MEMS sensors comprise an electronic circuitry, a power bus and a sensing portion; and
 disposing the plurality of MEMS sensors in a tape along the outer surface of the enclosure, wherein the tape comprises a cover that is impermeable in a location proximate of the electronic circuitry and the power bus, and the tape comprises a cover that is permeable in a location proximate the sensing portion.

13. The method of claim 12, comprising identifying a location of water infiltration from the plurality of MEMS sensors.

* * * * *